United States Patent
Aker et al.

(10) Patent No.: US 6,853,314 B1
(45) Date of Patent: Feb. 8, 2005

(54) SYSTEM AND METHOD FOR DISPLAY RADAR DATA

(75) Inventors: John L. Aker, Kansas City, MO (US);
Alan B. Mead, Plano, TX (US);
Robert S. Gammenthaler, Princeton, TX (US); Robert V. Vanman, McKinney, TX (US)

(73) Assignee: Applied Concepts, Inc., Plano, TX (US)

( * ) Notice: Subject to any disclaimer, the term of this patent is extended or adjusted under 35 U.S.C. 154(b) by 3 days.

(21) Appl. No.: 10/620,401

(22) Filed: Jul. 16, 2003

Related U.S. Application Data

(63) Continuation of application No. 09/931,269, filed on Aug. 16, 2001, now Pat. No. 6,744,379.

(51) Int. Cl.⁷ .................................. G08G 1/01
(52) U.S. Cl. .................. 340/936; 340/937; 342/104
(58) Field of Search ............................. 340/902, 903, 340/905, 933, 936, 937, 435, 441; 342/104, 112, 114, 115, 116; 701/36

(56) References Cited

U.S. PATENT DOCUMENTS

| | | | | |
|---|---|---|---|---|
| 4,740,045 A | * | 4/1988 | Goodson et al. | 342/112 |
| 5,525,996 A | * | 6/1996 | Aker et al. | 342/104 |
| 5,691,724 A | * | 11/1997 | Aker et al. | 342/104 |
| 6,198,427 B1 | * | 3/2001 | Aker et al. | 342/114 |
| 6,400,309 B1 | * | 6/2002 | Jones | 342/104 |
| 6,411,874 B2 | * | 6/2002 | Morgan et al. | 701/36 |
| 6,580,386 B1 | * | 6/2003 | Aker et al. | 342/104 |

\* cited by examiner

*Primary Examiner*—Van T. Trieu
(74) *Attorney, Agent, or Firm*—Christopher J. Rourk; Godwin Gruber LLP

(57) ABSTRACT

A system for displaying radar data from two or more areas of interest is provided, such as for simultaneously showing vehicle speeds in the opposite lane in front of the patrol vehicle and in the same lane behind the patrol vehicle. The system includes a first display that shows the speed of vehicles in the first area, such as the opposite lane in front of the patrol vehicle, and a second display that shows the speed of vehicles in the second area, such as the same lane behind the patrol vehicle.

18 Claims, 7 Drawing Sheets

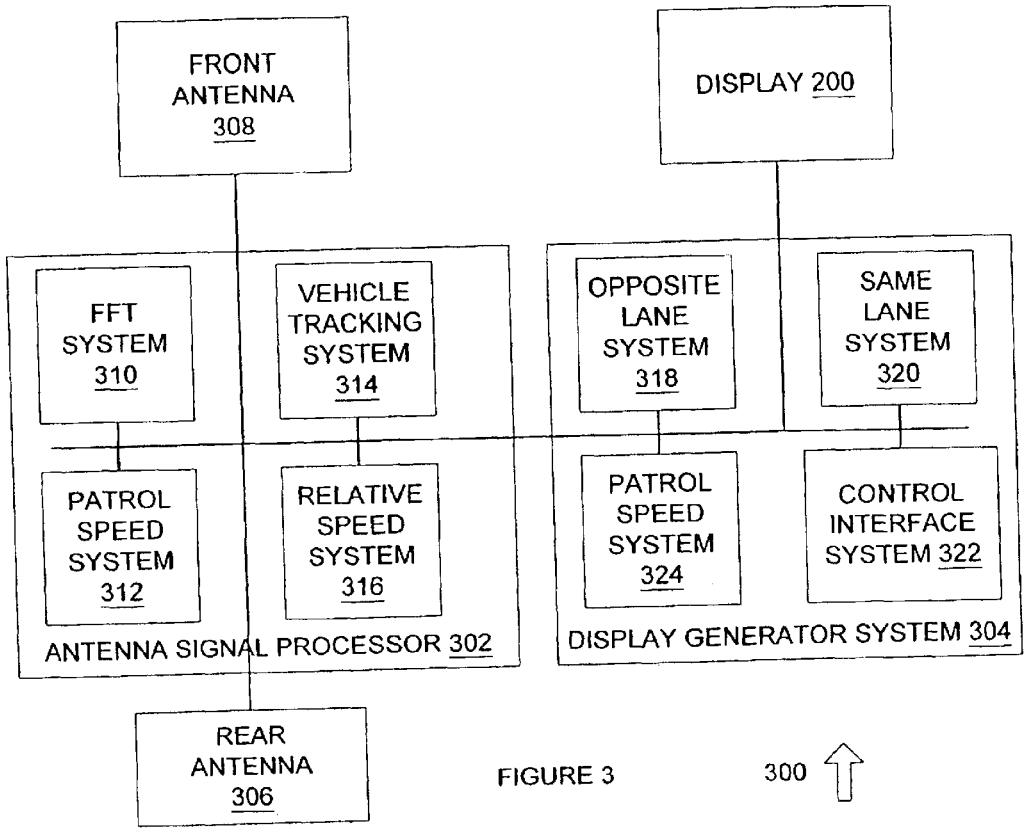
FIGURE 3
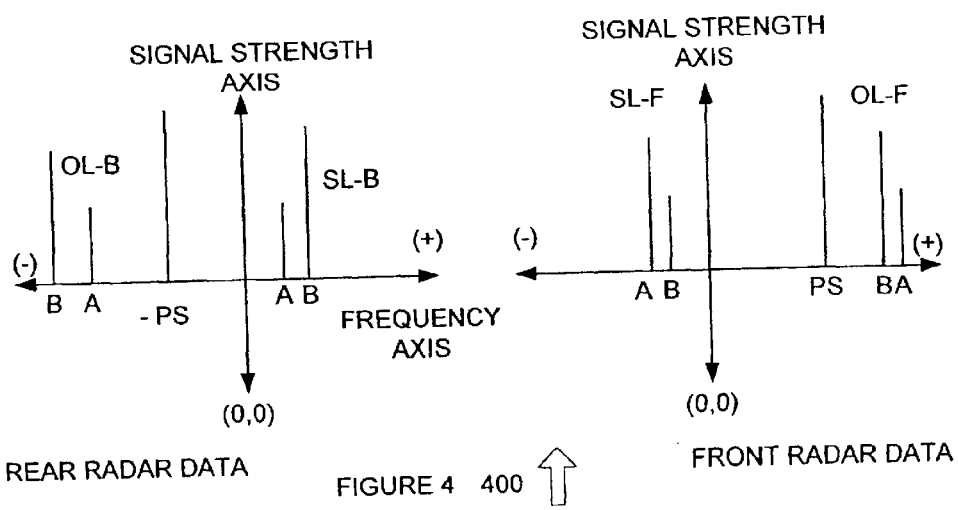
REAR RADAR DATA    FIGURE 4  400    FRONT RADAR DATA

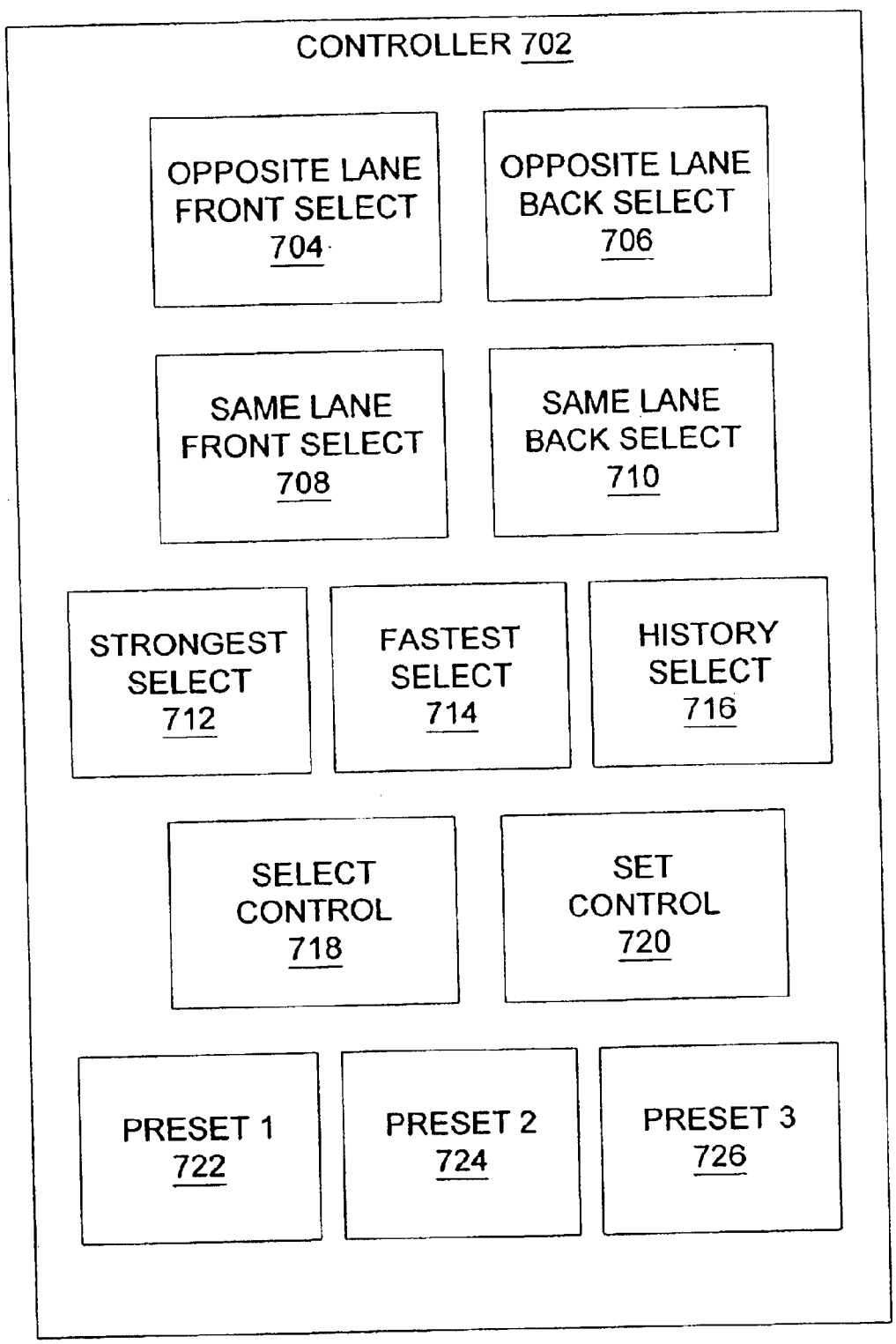
FIGURE 7

SYSTEM AND METHOD FOR DISPLAY RADAR DATA

CROSS-REFERENCE TO RELATED APPLICATIONS

This invention is a continuation of U.S. application Ser. No. 09/931,269, filed on Aug. 16, 2001, now U.S. Pat. No. 6,744,379 which is hereby incorporated by reference for all purposes.

FIELD OF THE INVENTION

The present invention pertains to the field of speed detection radar systems. More specifically, the invention relates to a system and method for processing and displaying radar data that allows radar data from more than one antenna to be simultaneously processed and displayed.

BACKGROUND OF THE INVENTION

Systems for detecting and displaying radar data are known in the art. For example, U.S. Pat. No. 5,691,724, "A Police Traffic Radar Using FFT Processing to find Fastest Target," issued to Aker et al ("Aker") discloses a speed detecting radar system that is used to determine the speed of vehicles. Aker describes the use of digital signal processing that includes fast Fourier transform (FFT) processing of the reflected radar signal to determine the speed of one or more target vehicles.

One of the characteristics of many prior art radar speed detection systems is that they present data in non-flexible formats. The level of training and familiarity with radar speed detection equipment varies among police officers and other authorized users. Because police departments typically purchase standardized equipment, they purchase equipment that has essentially the same format. Furthermore, limitations on processor speed and the limited operating environment in which available displays can operate limit both the amount of data that can be processed by a speed detecting radar and the ability to display that data in a flexible manner, such as by using a video display terminal.

SUMMARY OF THE INVENTION

In accordance with the present invention, a system and method for processing and displaying radar data are presented that improve upon prior techniques of processing and displaying radar data.

In particular, a system and method for processing and displaying radar data are provided that allow radar data for vehicles travelling in two or more different directions relative to an observation point to be processed and displayed to a user in a user-selectable format.

In accordance with an exemplary embodiment of the present invention, a system for displaying radar data from two or more areas of interest is provided, such as for simultaneously showing vehicle speeds in the opposite lane in front of the patrol vehicle and in the same lane behind the patrol vehicle. The system includes a first display that shows the speed of vehicles in the first area, such as the opposite lane in front of the patrol vehicle, a second display that shows the speed of vehicles in the second area, such as the same lane behind the patrol vehicle and possibly one or more additional displays that show the speed of vehicles in additional areas such as the opposite lane behind the patrol vehicle or the same lane in front of the patrol vehicle.

Embodiments of the present invention provide many important technical advantages. One advantage of an embodiment of the present invention is a system and method for processing and displaying radar data that allows data on vehicle speeds in different directions to be presented to an operator. This embodiment thus allows an operator to simultaneously view radar data for vehicles in the same lane, in the opposite lane, in front of the reference point, behind the reference point, and in other suitable locations. Other embodiments of the present invention also allow the operator to configure the display in response to the patrol environment.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 3 is a diagram of a system for processing and displaying radar data in accordance with an exemplary embodiment of the present invention;

FIG. 4 is a diagram of a signal strength indicator display showing frequency domain components of the radar signal received from two or more antennae, in accordance with an exemplary embodiment of the present invention;

FIG. 7 is a remote control for providing control data to a radar speed detector system in accordance with an exemplary embodiment of the present invention;

DETAILED DESCRIPTION OF THE INVENTION

Figure 1:
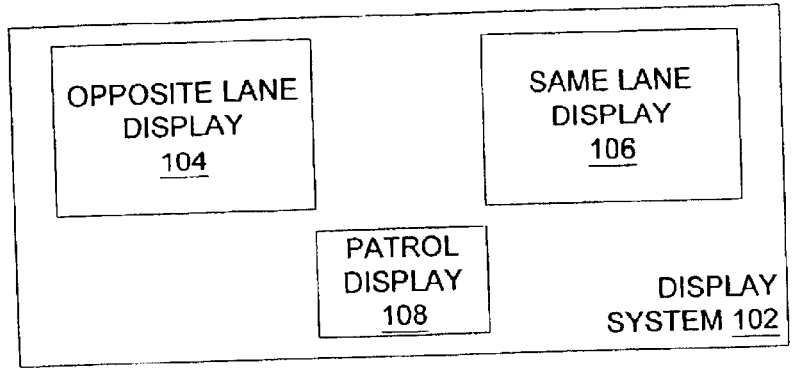
FIG. 1 is a diagram of a system for displaying multi-lane radar data in accordance with an exemplary embodiment of the present invention.

In the description that follows, like parts are marked throughout the specification and drawings with the same reference numerals, respectively. The drawing figures are not necessarily to scale, and certain components can be shown in generalized or schematic form and identified by commercial designations in the interest of clarity and conciseness.

FIG. 1 is a diagram of a system 100 for displaying radar data in accordance with an exemplary embodiment of the present invention. System 100 allows speed and signal strength data for vehicles traveling in different lanes or in different directions relative to the direction of travel of the patrol vehicle to be displayed on a single display.

System 100 includes display system 102, opposite lane display 104, same lane display 106, and patrol display 108, each of which are visual displays generated for viewing by an operator in an automobile or other suitable vehicles. In one exemplary embodiment, system 100 can be implemented using an Optrex F-51136 graphic liquid crystal display (LCD), available from Optrex America Inc. of Plymouth, Mich. Likewise, system 100 can be implemented using a suitable combination of light emitting diodes (LEDs), or other displays that can operate over a temperature range of −30° C.–85° C. and in vehicular environments.

System 100 can also include one or more software systems operating on a suitable processor that generates display data, touch-sensitive control interface data, and other suitable data, such as a Motorola MC68336GCFT20 microprocessor or other suitable processors. As used herein, a software system can include one or more objects, agents, threads, line of code, subroutines, separate software applications, two or more lines of code or other suitable software structures operating in two or more separate software applications, on two or more different processors, or other suitable software architectures. In one exemplary embodiment, a software system can include one or more lines of code or other suitable software structures operating in a general purpose software application, such as an operating system, and one or more lines of code or other suitable software structures operating in a specific purpose software application.

Opposite lane display 104 generates a display showing the relative signal strength, a fastest target, historical data, and other suitable data for opposite lane vehicular traffic. In one exemplary embodiment, opposite lane display 104 can include a display for the speed of the vehicle with a strongest signal, a display for the vehicle having a fastest speed, historical data for either or both vehicles, and other suitable data for the opposite lane oncoming vehicular traffic. Likewise, opposite lane display 104 can include similar data for the opposite lane traffic after it has passed the radar observation point, such as a patrol vehicle, from the rear. In this manner, opposite lane display 104 can allow the operator of a patrol vehicle to view the speed of a vehicle having a strongest signal, a fastest vehicle, and historical data for both vehicles for opposite lane traffic in front of and to the rear of the patrol vehicle.

Same lane display 106 generates a display showing the relative signal strength, fastest target, historical data, and other suitable data for same lane vehicular traffic. In one exemplary embodiment, same lane display 106 can include a display for the speed of the vehicle with a strongest signal, a display for the vehicle having a fastest speed, historical data for either or both vehicles, and other suitable data for vehicular traffic in the same lane that is in front of the radar observation point, such as a patrol vehicle. Likewise, same lane display 106 can include similar data for the same lane traffic to the rear of the radar observation point. In this manner, same lane display 106 can allow the operator of a patrol vehicle to view the speed of the vehicle having a strongest signal, a fastest vehicle, and historical data for both vehicles for same lane traffic in front of and to the rear of the patrol vehicle.

Patrol display 108 receives patrol vehicle speed data and generates a reference speed display. Patrol display 108 can receive speedometer data, background radar data, or other suitable data that has been converted into a patrol vehicle speed indicator data signal, and generates a numerical display for viewing by the operator of system 100.

In one exemplary embodiment for a moving patrol car, the operator can use radar data from one antenna (either front or rear) without the requirement that the other antenna be operating or present. In this embodiment, the display can include opposite lane display 104 and same lane display 106 at the same time for that referenced direction.

In another exemplary embodiment, opposite lane display 104, same lane display 106, and patrol display 108 can be configured so as to respond to touch sensitive controls, such as by using an Optrex F-51136 graphic LCD or other suitable devices that support the generation of touch sensitive displays. In this exemplary embodiment, when the operator touches part of display system 102, the coordinates of the location that the operator touched are converted into control data and are transmitted to a controller (such as a TI ADS 7842 Touch Screen Controller or other suitable systems or devices) that uses the control data to modify the display. In this manner, the operator can indicate that oncoming or receding traffic in either the opposite lane display 104 or same lane display 106 should be turned on or turned off, moved to a new location, locked, unlocked, or that other suitable actions should be taken. Likewise, the size or location of numerical speed displays for vehicles having a strongest signal or a fastest speed can be modified, such as by "dragging" the display to a desired location, "dragging" the borders of the display to change the size of the display, by using menu-driven selection processes that allow the user to configure the display into one or more predetermined templates, or in other suitable manners.

Likewise, system 100 can be implemented using fixed display elements, such as LEDs, so that any modifications to the display system 102 can be made by setting control data to turn LEDs on or off. In this exemplary embodiment, the display features of display system 102 cannot be moved relative to each other, such as by "dragging" or other suitable functions. Likewise, modifications to the display must be made within the framework of the fixed display elements. In this exemplary embodiment, the display can be configured to show a predetermined number of vehicles, such as:

1. The speed of the vehicle having a strongest signal and the speed of the vehicle having a fastest speed, with additional indicators showing whether each vehicle is in the same lane or an opposite lane, and whether the vehicle is in front of or behind the reference point (total of two vehicles maximum).
2. The speed of the vehicle having a strongest signal and the speed of the vehicle having a fastest speed in each lane, with one additional indicator showing whether the vehicle is in front of or behind the reference point (total of four vehicles maximum).
3. The speed of the vehicle having a strongest signal and the speed of the vehicle having a fastest speed in front and in back, with one additional indicator showing whether the vehicle is in the same lane or the opposite lane (total of four vehicles maximum).
4. The speed of the vehicle having a strongest signal and the speed of the vehicle having a fastest speed in each lane and both in front of and behind the reference point (total of eight vehicles maximum).

In this exemplary embodiment, additional controls can also be provided, such as a feature that locks the display to show a selected vehicle's speed, a control that turns off a display that is not presently of interest to an operator, or other suitable controls.

In operation, system 100 allows an operator of a speed detecting radar system to view speed indication data for vehicles in two or more separate directions relative to a reference point. System 100 can also allow the operator of a speed detecting radar to configure the display to meet current patrol conditions, so as to remove unnecessary data from the display and to facilitate the ease with which an operator can confirm observations of persons exceeding speed limits.

Figure 2:
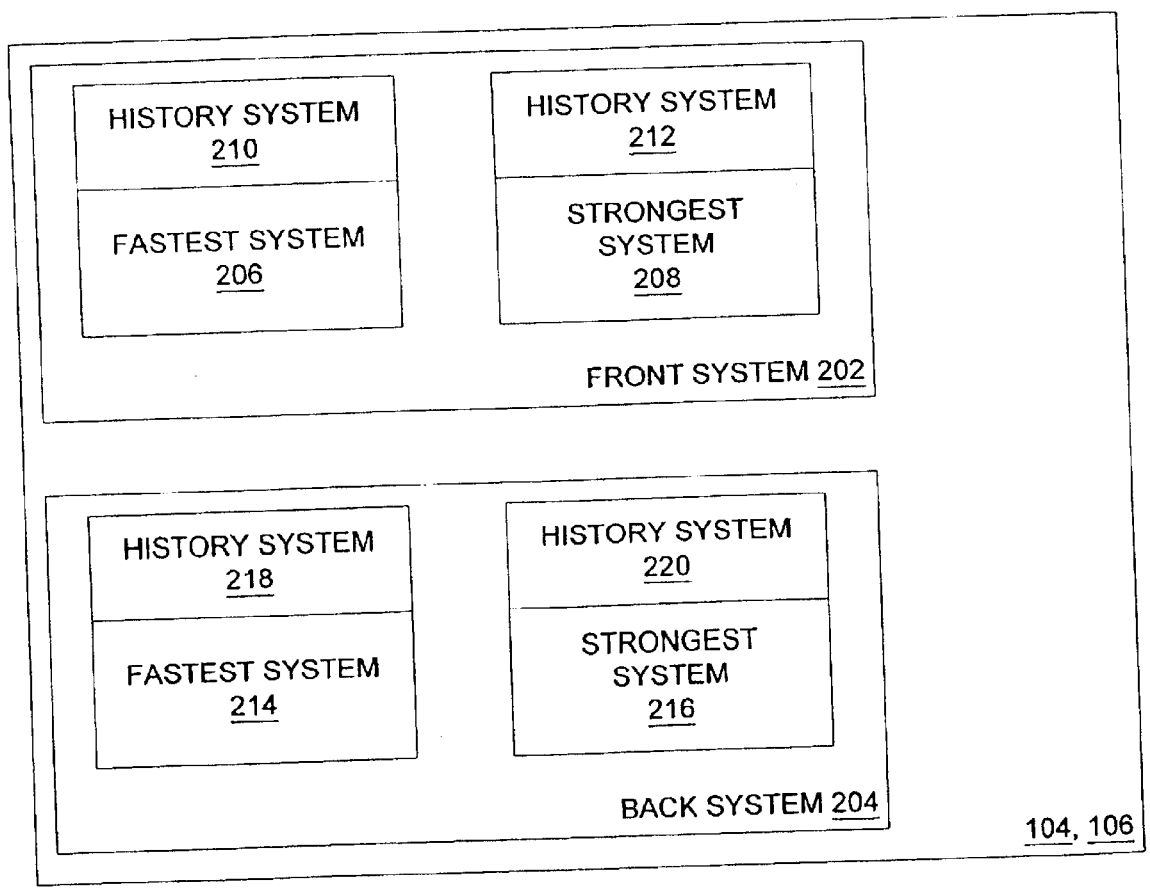
FIG. 2 is a diagram of a system for displaying radar speed data in accordance with an exemplary embodiment of the present invention.

FIG. 2 is a diagram of a system 200 for displaying radar speed data in accordance with an exemplary embodiment of the present invention. System 200 allows an operator to select the display of speed data for up to eight vehicles in a simple and easily understood manner so as to facilitate the monitoring of traffic speeds and conditions by the operator.

System 200 includes either or both of opposite lane display 104 or same lane display 106, which can each include front system 202 and back system 204. Each of front system 202 and back system 204 further includes fastest system 206 and 214, and strongest system 208 and 216, respectively. Likewise, each of fastest system 206, fastest system 214, strongest system 208, and strongest system 216, can have a corresponding history system 210, 218, 212, and 220, respectively.

Any of the subsystems of system 200 can be turned on or off by an operator to increase or decrease the amount of data being provided to the operator, such as to accommodate current patrol conditions. In one exemplary embodiment, history systems 210, 212, 218, and 220 can be omitted, such that only fastest systems 206 and 214 and strongest systems 208 and 216 are available. In another exemplary embodiment, a single indicator can be used that allows only one of fastest system 206 and 214 to be displayed and only one of strongest systems 208 and 216 to be displayed, where the operator can select for each system to display data for vehicles either in the front or in the back. In this exemplary embodiment, the operator could elect to view the speed of the vehicle providing a strongest signal from both the front and the back system, the speed of a fastest vehicle from the front and the back system, the speed of a fastest vehicle from the front and the speed of the vehicle having a strongest signal from the rear, or other suitable combinations of speed data. For the following 8 vehicle classes for type of vehicle and direction relative to the radar observation point, any suitable combination of classes 1 through 8 can be used in conjunction with display system 102 and system 200:
1. Same lane, front, speed of vehicle with a strongest signal.
2. Same lane, rear, speed of vehicle with a strongest signal.
3. Opposite lane, front, speed of vehicle with a strongest signal.
4. Opposite lane, rear, speed of vehicle with a strongest signal.
5. Same lane, front, speed of vehicle with a fastest speed.
6. Same lane, rear, speed of vehicle with a fastest speed.
7. Opposite lane, front, speed of vehicle with a fastest speed.
8. Opposite lane, rear, speed of vehicle with a fastest speed.
Using these indicators, the following combinations could be used to display the speed of vehicular traffic in either the front or rear of the observation point, and in either the same lane or the opposite lane as the observation point: any 1 of the 8 classes of vehicles (8 combinations); any 2 of the 8 classes of vehicles (28 combinations); any 3 of the 8 classes of vehicles (56 combinations); any 4 of the 8 classes of vehicles (70 combinations); any 5 of the 8 classes of vehicles (56 combinations); any 6 of the 8 classes of vehicles (28 combinations); any 7 of the 8 classes vehicles (8 combinations); and all 8 of the 8 classes of vehicles (1 combination).

Likewise, system 200 can allow an operator to see additional data in response to touch sensitive controls or other suitable controls. For example, an operator can configure system 200 to display speeds by using touch sensitive control areas on the display, such as where the display initially shows all available fields in a setup mode, and the operator turns fields off by touching them. Likewise, a pull-down menu, a remote controller or other suitable controls can be used to allow the operator to select fields for viewing.

In operation, system 200 receives vehicle speed data and generates user-readable display data for vehicles travelling in two or more different directions relative to a radar observation point. System 200 allows an operator to flexibly display as few as one and as many as eight different signals in a single display. System 200 thus allows an operator to configure a display in response to changing patrol conditions, to match operator presets, or for other suitable purposes.

FIG. 3 is a diagram of a system 300 for processing and displaying radar data in accordance with an exemplary embodiment of the present invention. System 300 allows a fast Fourier transform to be performed on antenna data from two or more antennae, and further allows display data to be generated that allows the radar data to be easily tracked by an operator.

System 300 includes antenna signal processor 302, which can be implemented in hardware, software, or a suitable combination of hardware and software, and which can be one or more software systems operating on a Motorola 56307 DSP and associated digital signal processing equipment. In one exemplary embodiment, antenna signal processor 302 can be configured with associated devices in a manner similar to counting/display unit 12 of U.S. Pat. No. 5,691,724, which is hereby expressly incorporated by reference for all purposes. The digital signal processor of antenna signal processor 302 performs simultaneous digital data processing for both antennae, for same lane and opposite lane traffic of a single antenna, or for other suitable combinations antennae signals.

Antenna signal processor 302 is coupled to rear antenna 306 and front antenna 308, each of which can be configured similar to the radar antenna shown in U.S. Pat. No. 5,691,724 or other suitable radar antennae, and can be connected to antenna signal processor 302 in a manner similar to that shown in the U.S. Pat. No. 5,691,724 patent or in other suitable manners. As used herein, the term "couple," and its cognate terms such as "couples" and "coupled", can include a physical connection (such as through a copper conductor), a virtual connection (such as one or more randomly assigned memory locations of a data memory device), a logical connection (such as through one or more logical devices of a semiconducting circuit), a wireless connection, other suitable connections, or a suitable combination of such connections. In one exemplary embodiment, systems and components are coupled to other systems and components through intervening systems and components, such as through an operating system of a digital signal processor.

Antenna signal processor 302 further includes FFT system 310, patrol speed system 312, vehicle tracking system 314, and relative speed system 316, each of which can be implemented in hardware, software or a suitable combination of hardware and software, and which can be one or more software systems operating on a digital signal processor. Antenna signal processor 302 receives radar data from one or more radar antennae and generates speed data for vehicles travelling in two or more directions relative to the radar observation point.

FFT system 310 receives the radar signals generated by front antenna 308 and rear antenna 306, and performs a fast Fourier transform on the signals. In one exemplary embodiment, fast Fourier analysis can be performed after the signals have been mixed with a reference oscillator signal to create a base band signal and converted to a digital data format. In this manner, front antenna 308 and rear antenna 306 are used to receive reflected radar signals from moving vehicles, after the radar signals have been Doppler shifted. FFT system 310 converts the time domain base band signal into the frequency domain, where the speed of each vehicle can be represented as a frequency band centered at a main frequency and where the frequency shift from the origin represents the speed relative to the radar source. In this manner, the speed of each vehicle can be estimated by the degree of frequency shift from the origin of a frequency domain regime.

FFT system 310 processes radar signals in suitable time steps, such as one frame every 46 milliseconds. The processing time for a frame of radar data will be a function of the frequency resolution required, where differences in frequency correspond to differences in the speed of vehicles being tracked. Thus, any suitable radar frame refresh rate can be used, up to approximately 100 milliseconds per frame. If the radar frame refresh rate exceeds approximately 100 milliseconds, the time interval between radar frames can result in a decrease in output data quality that is noticeable to the user. The radar frames from each antenna can be processed in a suitable order, such as one front antenna frame followed by one rear antenna frame, two front antenna frames followed by two rear antenna frames, or in other suitable manners.

FFT system 310 can also process data for one or more of the 8 classes of vehicles previously described. In one exemplary embodiment, FFT system 310 processes data for each of the 8 classes of vehicle, regardless of whether the data for each class is presently being displayed. In this embodiment, it is preferable to support signal processing for up to 8 vehicles simultaneously. In another exemplary embodiment, FFT system 310 can receive control data indicative of the classes of vehicle for which data is being generated, and can restrict the processing of radar data to only those classes, so as to conserve the amount of energy consumed by antenna signal processor 302.

Patrol speed system 312 receives the FFT data (such as one or more of the group including the frequency shift, the absolute or relative speed, the signal strength magnitude or relative magnitude ranking, or other suitable data) from FFT system 310 and determines the speed of the patrol vehicle based upon the speed indicated by the background radar reflection. Patrol speed system 312 can use the speed data from the front antenna 308 and rear antenna 306 so as to independently confirm the speed determined from FFT data, can use a speedometer input signal to independently confirm the speed, or can use other suitable processes. Patrol speed system 312 can generate data representative of the patrol vehicle's current ground speed, and can transfer the data to display generator system 304.

Vehicle tracking system 314 preferably receives frequency domain data from FFT system 310 and tracks the location of individual vehicles in the frequency domain data. In one exemplary embodiment, vehicle tracking system 314 can assign a suitable identification tag to each vehicle identified from the frequency domain data obtained from FFT system 310 when such vehicles are first identified, and can then track the speed of each vehicle over time, the signal strength associated with each vehicle, and other suitable data. In this manner, vehicle tracking system 314 maintains continuity between successive radar reading scans so as to allow the historical data for vehicles to be tracked and stored. In another exemplary embodiment, vehicle tracking system 314 can determine which vehicle is presently a fastest and which vehicle presently has a strongest signal, such as where historical data is not required.

Relative speed system 316 determines the actual speed of each vehicle detected by vehicle tracking system 314 from the relative speed generated by vehicle tracking system 314. In one exemplary embodiment, relative speed system 316 can receive the vehicle speed of each vehicle from vehicle tracking system 314 and the patrol speed from patrol speed system 312, and can perform suitable operations on the data to generate the actual ground speed of the vehicle. Relative speed system 316 then generates data for use by display generator system 304, such as data that identifies each vehicle as being either in the same lane, the opposite lane, in front of the reference point, behind the reference point, or in other suitable locations.

Display generator system 304 includes opposite lane system 318, same lane system 320, patrol speed system 324, and control interface system 322, each of which can be implemented in hardware, software, or a suitable combination of hardware and software, and which can one or more software systems operating on a general purpose display processor. Display generator system 304 receives display control data, processor control data, vehicle speed data and other suitable data, and generates user-readable display data.

Opposite lane system 318 generates display data for vehicles traveling in the opposite lane relative to the direction of travel of the reference point. In one exemplary embodiment, opposite lane system 318 receives vehicle speed data derived from radar data generated by front antenna 308 and rear antenna 306 data, and generates display data showing the speed of the vehicle having a fastest speed, a strongest signal, and other suitable data for vehicles in the opposite lane. In another exemplary embodiment, opposite lane system 318 receives one or more pointers that identify a memory location at which the opposite lane vehicle speeds are stored, or other suitable data. Thus, opposite lane system 318 can receive processed data that has initially been generated by front antenna 308 and rear antenna 306, and can format the data into a predetermined data format for display to an operator.

Same lane system 320 generates display data for vehicles traveling in the same lane relative to the direction of travel of the reference point. In one exemplary embodiment, same lane system 320 receives vehicle speed data derived from radar data generated by front antenna 308 and rear antenna 306 data, and generates display data showing the speed of the vehicle having a fastest speed, a strongest signal, and other suitable data for vehicles in the same lane. In another exemplary embodiment, same lane system 320 receives one or more pointers that identify a memory location at which the same lane vehicle speeds are stored, or other suitable data. Thus, opposite lane system 318 can receive processed data that has been generated by front antenna 308 and rear antenna 306, and can format the data into a predetermined data format for display to an operator.

Patrol speed system 324 receives the patrol speed data from patrol speed system 312, and generates a patrol speed display for reading by the operator of system 300. Likewise, patrol speed system 312 can generate display data directly, where suitable, such that the functions of patrol speed system 324 are performed by patrol speed system 312. In another exemplary embodiment, patrol speed system 324 receives one or more pointers that identify a memory location at which the patrol vehicle speed is stored, or other suitable data.

Control interface system 322 receives control data from a suitable control input device, such as by using a touch-sensitive display that generates coordinate data from a display, a keyboard, a remote control having wireline or wireless data transfer functionality, voice commands, or other suitable control interfaces. In one exemplary embodiment, control interface system 322 allows a user to configure a display to show vehicle speed data of interest to the user, such as for vehicles in the same lane, in the opposite lane, in front of a reference point, to the rear of a reference point, with a strongest signal in a given direction, with a fastest speed in a given direction, and other suitable vehicles. Control interface system 322 also allows an operator to view historical speed indicators for a vehicle, to freeze a speed for a user-selected vehicle, or to otherwise select a suitable combination of such vehicle speeds or speed data.

In operation, system 300 allows radar data from two or more radar antennae to be processed and transformed into data for viewing by an operator of a radar speed detection system. System 300 converts the radar data into vehicle speed data, and generates display data containing the vehicle speed data so as to allow an operator to easily confirm vehicle speed observations. System 300 also allows the operator to configure the display to display speed data for vehicles that are in areas of greatest interest to the operator.

FIG. 4 is a diagram of a signal strength indicator display 400 showing frequency domain components of the radar signal received from two or more antennae, in accordance with an exemplary embodiment of the present invention. The frequency domain components shown in display 400 include signals derived from at least one antenna oriented directly in front of a vehicle relative to the direction of travel, and at least one antenna oriented directly behind the vehicle.

The frequency domain signals shown in diagram 400 can be generated by first mixing the radar signal with an oscillator signal so as to generate a base band signal. The base band signal can then be transformed using fast Fourier transform analysis so as to isolate the frequency components of the signal. If more than one antenna is in use, a separate FFT analysis can be performed on the data from each antenna signal. Likewise, additional processes can be performed on the signal to reduce harmonic levels, noise, or other undesired signals. Other suitable techniques can also or alternatively be used.

As shown in diagram 400, a plurality of signals are present along the frequency axis, where each signal has a corresponding signal strength. The signals identified on the frequency axis as "PS" are reflections from the background environment and are thus indicative of the speed of the patrol vehicle, which will have a peak positive and negative displacement from the origin of approximately the same value. This peak positive and negative displacement indicates that the patrol vehicle is traveling in a first speed relative to the front facing antenna, and a second speed relative to the rear facing antenna, where the magnitude of the speed is the same but has an opposite sign. Thus, if the speed indicated by the +PS or −PS readings differs, an error signal can be generated to allow diagnostic tests to be performed to determine whether either or both of the signals generated by front antenna 308 and rear antenna 306 are in error. Likewise, if the absolute value of the +PS and −PS readings are similar within a predetermined tolerance, then the +PS and −PS readings can be used to determine the patrol speed in the absence of a speedometer, such as by averaging or other suitable procedures. Furthermore, the +PS and −PS readings can be used in combination to improve patrol speed tracking and mitigate or eliminate problems that require resetting patrol speed search and acquisition, which can occur when a single PS reading is used to determine patrol speed.

In addition to vehicle background speed indicators, there will be speed indicators in the fast Fourier transform components for vehicular traffic in the same lane and opposite lane, and from the front and back antennas. For example, the opposite lane front antenna will generate indicators for vehicles at the high positive frequency axis when the patrol vehicle is moving, as shown by "OL-F" signals A and B. In this exemplary embodiment, the indicator for a fastest vehicle, A, is different from the indicator for the vehicle with a strongest signal, B. Likewise, for traffic behind the reference point ("OL-B" signals A and B), the indicator for a fastest vehicle is also the indicator for the vehicle having a strongest signal, namely, "B".

For vehicular traffic in the same lane in which the patrol vehicle is moving, the relative speeds will be slower, and typically less than the speed of the patrol vehicle, "PS." Thus, for SL-B, the same lane vehicular traffic behind the patrol vehicle, the relative speed of the same lane traffic of interest to the operator will generally be equal to or greater than the speed of the patrol vehicle. In this exemplary embodiment, a fastest signal B is also a strongest signal. Likewise, for the same lane signal from the front, a fastest signal A is not a strongest signal B. Nevertheless, in the event the patrol vehicle is going slower or faster than traffic in the same lane, then it is possible that the relative locations of SL-B and SL-F could be reversed. Thus, for traffic in the same lane when the patrol vehicle is moving, it would be necessary to determine relative location based on the orientation of the antenna that generates the signal. An indicator of the antenna from which the signal was generated can be used to facilitate the simultaneous analysis of front and rear antenna radar data for both same lane and opposite lane vehicular traffic.

When the patrol vehicle is not moving, the speed of vehicles in the opposite lane will tend to be the same as the speeds for vehicles in the same lane, in which case it will be necessary to distinguish same lane traffic from opposite lane traffic based on the orientation of the antenna and relative speed. For example, for an antenna facing forward from a stationary reference point, vehicular traffic in the opposite lane will generate indicators on the positive frequency axis, and vehicular traffic in the same lane will generate indicators having approximately the same speeds on the negative frequency axis. The antenna facing the rear will generate negative axis indicators for opposite lane traffic, and positive axis indicators for same lane traffic.

In operation, diagram 400 shows the relative peak frequency component indicators for vehicular traffic in the same and opposite lanes for signals generated from radar antennae in the front and back of a moving patrol vehicle. These indicators can be used to track the speed of vehicles, such as by assigning a suitable tracking identification number to each indicator as it becomes distinguishable, and displaying the vehicle's speed if the indicator for the vehicle shows that it either has a fastest speed or a strongest signal. Signals from the front and back antennae of a patrol vehicle can also be provided with identifiers so as to allow the relative position of each vehicle to be determined.

Figure 5:
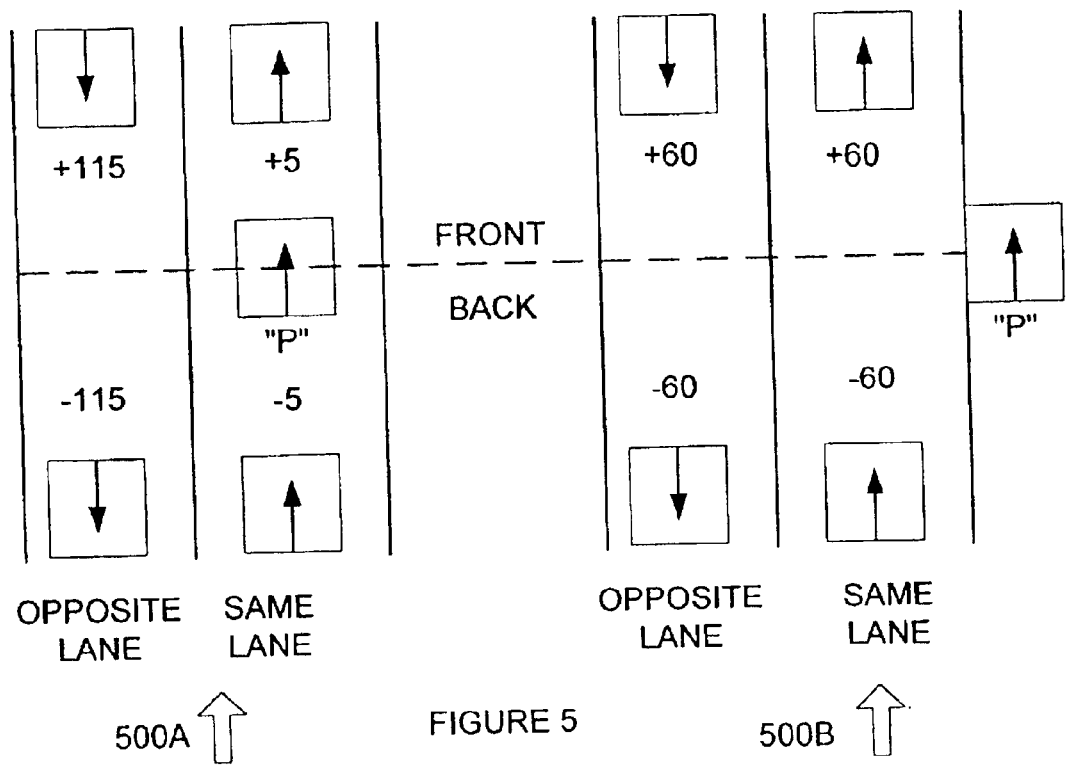
FIG. 5 shows relative vehicular speeds for understanding concepts of the present invention.

FIG. 5 includes diagrams 500A and 500B, which show relative vehicular speeds for understanding concepts of the present invention. Diagram 500A shows a patrol vehicle "P" moving in the direction shown by the arrow corresponding to P. The vehicle in front of P in the same lane is traveling at a speed of an additional 5 miles per hour relative to P. If P is travelling at 55 miles per hour, then it can be determined that the vehicle in front of P is travelling at 60 miles per hour. Likewise, the vehicle behind P in the same lane is traveling at a relative speed of 5 miles per hour away from P, which corresponds to a speed of 50 miles per hour if P is travelling at 55 miles per hour. In this exemplary embodiment, it would not be possible to determine whether a vehicle is behind or in front of the reference point, nor whether a vehicle is speeding or travelling at a lawful speed, unless the antenna from which the signal originated was known.

In the opposite lane, the vehicle approaching P is moving at 115 miles an hour relative to P. If P is travelling at 55 miles per hour, it can be determined that the approaching vehicle is traveling 60 miles an hour. The vehicle behind P in the opposite lane is receding from P at 115 miles an hour, such that it can be determined that the vehicle is moving at 60 miles an hour if P is moving at 55. In this exemplary embodiment, it is possible to determine whether a vehicle is behind or in front of the reference point, or whether a vehicle is speeding or travelling at a lawful speed, without knowing which antenna the signal originated from.

Diagram 500B shows a stationary patrol vehicle "P." The vehicles in front of P are moving at speeds of 60 miles per hour, but in opposite relative directions. Likewise, the vehicles behind P are also moving at 60 miles per hour, in opposite relative directions. Thus, both the orientation of the antennas and the FFT data of the two radar signals are preferably used to distinguish between forward and rear traffic, and same lane and opposite lane traffic.

Figure 6:
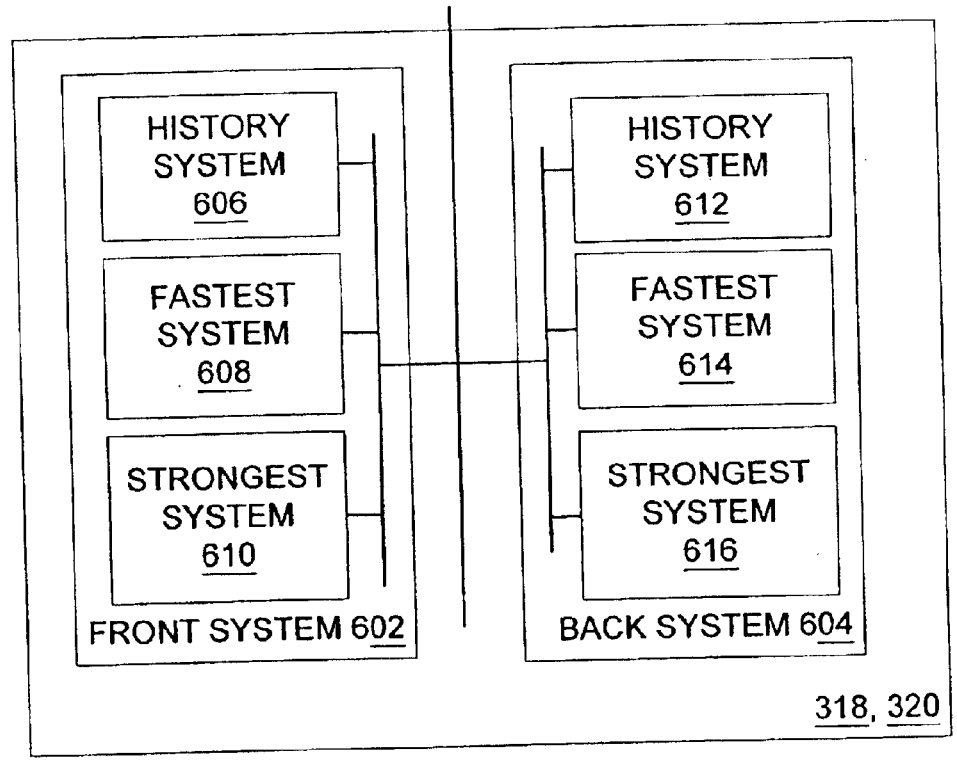
FIG. 6 is a diagram of a system for generating display data in accordance with an exemplary embodiment of the present invention.

FIG. 6 is a diagram of a system 600 for generating display data in accordance with an exemplary embodiment of the present invention. System 600 includes either or both of opposite lane system 318 and same lane system 320, each of which can further include front system 602, back system 604, history systems 606 and 612, fastest systems 608 and 614, and strongest systems 610 and 616, each of which can be implemented in hardware, software, or a suitable combination of hardware and software, in which can be one or more software systems operating on a general purpose processing platform. In one exemplary embodiment, system 600 can be implemented as one or more software systems operating on a Motorola MC68336GCFT20 microprocessor that generates user-selectable control fields on an Optrex F-51136 LCD with corresponding user-readable displays and processes command data received therefrom.

Front system 602 and back system 604 can each be implemented for either or both of opposite lane system 318 and same lane system 320. In one exemplary embodiment, front system 602 for opposite lane system 318 and same lane system 320 receives processed radar data from a front facing antenna such as front antenna 308, while back system 604 for opposite lane system 318 and same lane system 320 receives processed radar data from a rear facing radar antenna such as rear antenna 306.

History systems 606 and 612 generate historical data displays for vehicles. In one exemplary embodiment, each vehicle that is tracked by a radar speed detection system such as system 300 in FIG. 3 can be assigned suitable vehicle tracking data that is used to track the vehicle throughout the range of motion detectable by the radar antenna of the radar speed detection system. History systems 606 and 612 can each track the historical data for each vehicle, such as by storing a predetermined number of prior speed readings in a table or other suitable data structure, so as to show whether the vehicle is increasing in speed, decreasing in speed, maintaining constant speed, or otherwise to track speed data. History systems 606 and 612 can also respond to user-entered controls to display or suppress the history data, such as by generating a histogram of speeds for each selected vehicle, by printing out or storing a report to a data memory, or by using other suitable processes.

Fastest systems 608 and 614 are used to generate display data for a fastest vehicle presently being detected in the same lane and the opposite lane by a front facing antenna such as front antenna 308 and a rear facing antenna such as rear antenna 306, respectively. As shown in diagram 400, a fastest vehicle can be determined through a fast Fourier transform showing the speed relative to an observation point or other suitable data. In this exemplary embodiment, fastest system 608 receives the FFT data for a fastest vehicle detected by the front antenna for the same and the opposite lanes, and fastest system 614 receives the FFT data for a fastest vehicle detected by the rear antenna for the same and the opposite lanes. In another exemplary embodiment, fastest system 608 can receive the FFT data for all vehicles detected by the front antenna, determine which is a fastest one in each of the same and the opposite lane, and can generate suitable display data. Likewise, fastest system 614 can receive the FFT data for all vehicles detected by the rear antenna, determine a fastest one in the same and the opposite lane, and generate display data. In another exemplary embodiment, fastest systems 608 and 614 receive one or more pointers that identify a memory location at which the fastest vehicle speeds are stored, or other suitable data. Fastest systems 608 and 614 can also respond to user-entered controls to display or suppress the fastest vehicle data, such as by generating a speed display only for selected vehicles, by printing out or storing a report to a data memory, or by using other suitable processes. Other suitable techniques can also or alternatively be used.

Strongest systems 610 and 616 are used to generate data for a display showing the speed of the vehicle having a strongest signal in the same and the opposite lane for a front facing antenna and a rear facing antenna, respectively, such as the speed of a vehicle having the greatest magnitude of signal strength as shown in diagram 400. As shown in diagram 400, the speed of the vehicle having a strongest signal can be determined through a fast Fourier transform showing the speed relative to an observation point or other suitable data. In this exemplary embodiment, strongest system 610 receives the FFT data for the vehicles having strongest signals detected by the front antenna for the same and the opposite lanes, and strongest system 616 receives the FFT data for the vehicles having strongest signals detected by the rear antenna for the same and the opposite lanes. In another exemplary embodiment, strongest system 610 can receive the FFT data for all vehicles detected by the front antenna, determine which is a strongest one in each of the same and the opposite lane, and can generate suitable display data. Likewise, strongest system 616 can receive the FFT data for all vehicles detected by the rear antenna, determine a strongest one in the same and the opposite lane, and generate display data. Strongest systems 610 and 616 can also respond to user-entered controls to display or suppress a strongest signal data, such as by generating a display of speeds for each selected vehicle, by printing out or storing a report to a data memory, or by using other suitable processes. Other suitable processes can also or alternatively be used.

In operation, system 600 generates display data for displaying opposite lane and same lane traffic, both in front and behind a point of reference. System 600 can receive control data to suppress the generation of data, can receive control data to move the location of the display to a user selected or predetermined location, and can otherwise generate a user-controllable display for displaying historical data of vehicles, a fastest vehicle, the vehicle generating a strongest signal, and other suitable data.

FIG. 7 is a diagram of a remote control 700 for providing control data to a radar speed detector system in accordance with an exemplary embodiment of the present invention. Remote control 700 allows an operator to selectively control a display so as to display a suitable combination of front and back radar data, same lane and opposite lane radar data, fastest and strongest signal data, historical data and other suitable data.

System 700 includes controller 702, which can be a wired or wireless remote control platform that transmits data having preassigned control function associations. In one exemplary embodiment, controller 702 can transmit infrared data that is digitally encoded, where each digital control corresponds to a button or combination of buttons on controller 702.

Controller 702 further includes user selectable controls such as opposite lane front select 704, opposite lane back select 706, same lane front select 708, same lane back select 710, strongest select 712, fastest select 714, history select 716, select control 718, set control 720, preset 1 722, preset 2 724, and preset 3 726. Opposite lane front select 704 allows the operator to indicate that data for vehicles traveling in the opposite lane in front of the patrol vehicle should be displayed. In one exemplary embodiment, the user can select opposite lane front select 704 and select control 718, so that all data for vehicles traveling in the opposite lane in front of the patrol vehicle will be displayed, such as the speed of the vehicle with a strongest signal, the speed of a fastest vehicle, historical data for those vehicles, and other suitable data. Likewise, the user can select a suitable combination of controls to limit the amount of data displayed, such as by selecting opposite lane front select 704 and strongest select 712 prior to entering select control 718. In this manner, the user can indicate that only the speed of the vehicle having a strongest signal in the opposite lane should be displayed, and that no historical data should be displayed for that vehicle.

Other suitable combinations of controls can also be selected, such that the user can select to view one or more vehicle speed for one or more vehicles in same lane, the opposite lane, in front of the observation point, to the rear of the observation point, and for up to as many as eight vehicles. Likewise, where the display for the radar speed detector does not have a variable format, such as an LCD or other suitable display, selections through controller 702 can have the effect of only allowing LEDs to illuminate in predetermined locations so as to decrease the amount of information being provided through the fixed LED locations and the display.

In another exemplary embodiment, the display can include a predetermined number of preset LED locations and selections through controller 702 can be used to indicate the data that should provided for each LED location. Additional LED indicators or other data can be used to confirm the operator's selections and assist in the identification of the information being displayed. For example, in an LED display having three LED speed display sectors, each sector can include a first sub-indicator for showing whether it is displaying an opposite lane speed or same lane speed, a second sub-indicator for showing whether it is displaying a front or back speed, and a third sub-indicator for showing whether it is displaying a strongest signal or fastest speed.

Thus, in this exemplary embodiment, the LED speed display could indicate a number on top and three LED display sub-indicators underneath that could be used by an operator to determine whether the number correlates to a front or back lane, opposite or same lane, and a fastest speed or strongest signal. Other suitable configurations can likewise be used.

Controller 702 further includes preset 1 722, preset 2 724, preset 3 726, or other suitable combinations of presets. Presets 722 through 726 can be used to allow an operator to configure a display such that the operator can quickly change between preconfigured displays. In this exemplary embodiment, the operator may have a first preset for viewing relevant speeds of vehicles when the operator is stationary, a second preset for viewing speeds when the operator is moving in traffic in which the traffic is moving slower in same lane than the opposite lane, and a third preset for situations when the operator is moving in traffic in which the same lane traffic is moving fast and the opposite lane traffic is moving slow. In this exemplary embodiment, the operator can quickly reset the radar controls to focus the operator's attention on areas in which the operator is most likely to observe speeding vehicles.

In operation, controller 700 allows a user to set a display for a radar speed detection system in which the display can simultaneously show radar data for vehicles in front or in back of a radar observation point, in the same lane or opposite lane of the radar observation point, historical data, and other suitable data, in a user selectable combination. Controller 700 thus allows the user to control the display from a location outside of the vehicle or from a position in which access to the radar display unit or keypad for the radar display unit is not readily available.

Figure 8:
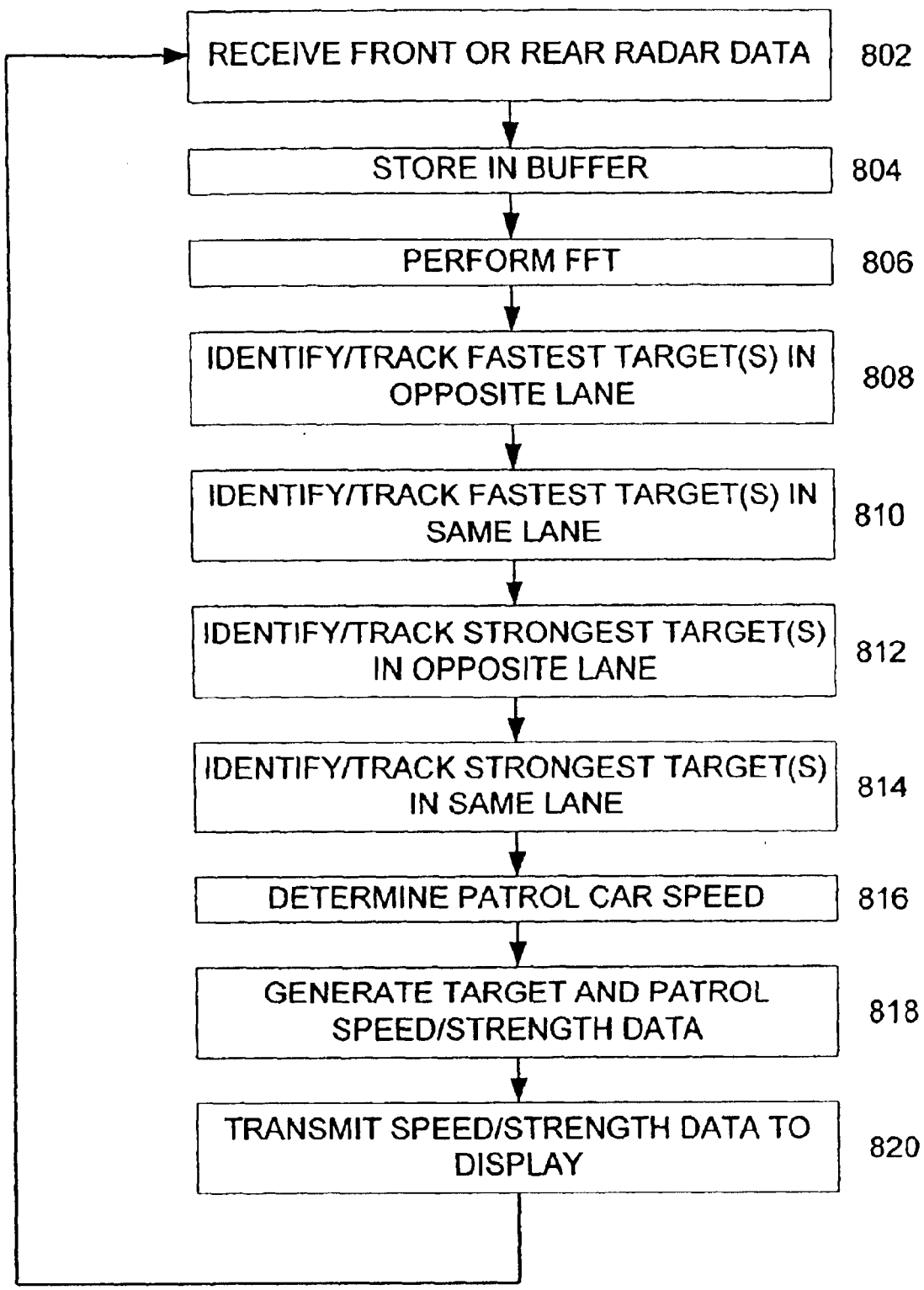
FIG. 8 is a flowchart of a method for processing radar data from two or more antennae in accordance with an exemplary embodiment of the present invention.

FIG. 8 is a flowchart of a method 800 for processing radar data from two or more antennae in accordance with an exemplary embodiment of the present invention. Method 800 begins at 802 where radar data is received from a front radar antenna or a rear radar antenna, such as where the data is generated in response to timing data or other suitable control data. Likewise, the radar data can be received simultaneously, such as by using separate buffers or processors and radar antennae that continuously generate radar data, or other suitable configurations. Additional radar antennae can be used where suitable, such as to provide two or more radar signals for speed verification, lateral movement measurement, or other suitable purposes. The method then proceeds to step 804.

At 804, the radar data is stored in a buffer. The buffer data can be stored after analog to digital conversion, can be stored in a buffer memory of a digital signal processor, or other suitable buffer memory can be used. Likewise, if processing occurs in parallel, two or more buffers or other suitable processes can be used. The method then proceeds to 806.

At 806, fast Fourier transform analysis is performed on the radar data to isolate the frequency components, such as by performing a separate fast Fourier transform analysis for each radar signal. The fast Fourier transform performed on each base band radar data will isolate frequency components above and below the origin, where each frequency component indicates the speed of an object, has a strength component, and includes other suitable data. The method then proceeds to 808.

At 808, the fastest targets in the opposite lanes are identified and/or tracked. In one exemplary embodiment, a target may first be identified when the radar signal from the target exceeds a minimum threshold in signal magnitude or meets other or additional criteria, where suitable. The target can then be given a suitable tracking number, such that subsequent radar measurements can be correlated to the previously measured location and speed of that target. Likewise, if the radar data indicates that the target has previously been identified, then the latest update of the radar data is associated with that target. In another exemplary embodiment, if historical data is not being maintained, then fastest targets can be processed independently in each data frame. Additional signal processing can also be performed, to provide better target resolution, reduce noise, or for other suitable purposes. The method then proceeds to 810.

At 810, the fastest targets in the same lanes are identified and/or tracked. In one exemplary embodiment, a target may first be identified when the radar signal from the target exceeds a minimum threshold in signal magnitude or meets other or additional criteria, where suitable. The target can then be given a suitable tracking number, such that subsequent radar measurements can be correlated to the previously measured location and speed of that target. Likewise, if the radar data indicates that the target has previously been identified, then the latest update of the radar data is associated with that target. In another exemplary embodiment, if historical data is not being maintained, then fastest targets can be processed independently in each data frame. Additional signal processing can also be performed, to provide better target resolution, reduce noise, or for other suitable purposes. The method then proceeds to 812.

At 812, the targets having strongest signals are identified or tracked for the opposite lane. In one exemplary embodiment, signal strength can be compared after targets have been identified and tracked and the speed has been determined, so as to identify the targets having greatest signal strengths. In another exemplary embodiment, if historical data is not being maintained, then the targets having strongest signals can be processed independently in each data frame. Additional signal processing can also be performed, to provide better target resolution, reduce noise, or for other suitable purposes. The method then proceeds to 814.

At 814, the targets having strongest signals are identified or tracked for the same lane. In one exemplary embodiment, signal strength can be compared after targets have been identified and tracked and the speed has been determined, so as to identify the targets having greatest signal strengths. In another exemplary embodiment, if historical data is not being maintained, then the targets having strongest signals can be processed independently in each data frame. Additional signal processing can also be performed, to provide better target resolution, reduce noise, or for other suitable purposes. The method then proceeds to 816.

At 816, the patrol vehicle speed is determined. In one exemplary embodiment, the patrol vehicle speed can be determined by comparing the ground reflection or background radar signal from the front radar antenna, the rear radar antenna, and other suitable radar antennae, so as to obtain independent radar derived patrol vehicle speed. In this regard, using the radar signal from the front antenna to generate front speed data and the radar signal from the rear antenna to generate rear speed data can reduce or eliminate problems that require resetting of patrol speed search and acquisition processes, which can occur when a moving patrol car comes to a stop or in other situations. These problems can occur when the strongest signal present (which typically is representative of the background signal) from a single radar signal includes signals generated from close-by moving vehicles. Using two vehicle speed signals for the patrol vehicle allows such misleading signals to be filtered, such as by comparing the front and rear patrol vehicle speed signal and using the signals when they are within a predetermined tolerance or in accordance with other suitable procedures. Speedometer data can also be received, or other suitable means for tracking patrol vehicle speed can be used. The method then proceeds to 818.

At 818, target speed and signal strength data is generated, such as by determining the absolute speed of each target from the relative speed of the target to the patrol vehicle or observation point. Likewise, target signal strength data identifying the target having a strongest signal can be generated. The method then proceeds to 820.

At 820, the target signal strength and speed data is transmitted to a display for generation of a user display showing same lane and opposite lane radar data for front and rear antennae. The display can include a display processor, the data can be preformatted for use by a display device, or other suitable configurations can be used. The target signal strength and speed data can include historical speed data, such as to display the change in speed over time for one or more selected targets or for other suitable purposes.

In operation, method 800 allows radar data from two or more antennae to be processed to identify targets having a strongest signal, a fastest target, historical data, or other suitable data. Method 800 allows front and rear antenna, multiple antennae or other suitable combinations of radar antennae to be used so as to provide data to an operator for confirming the identification of speeding vehicles or for other suitable uses.

Figure 9A:
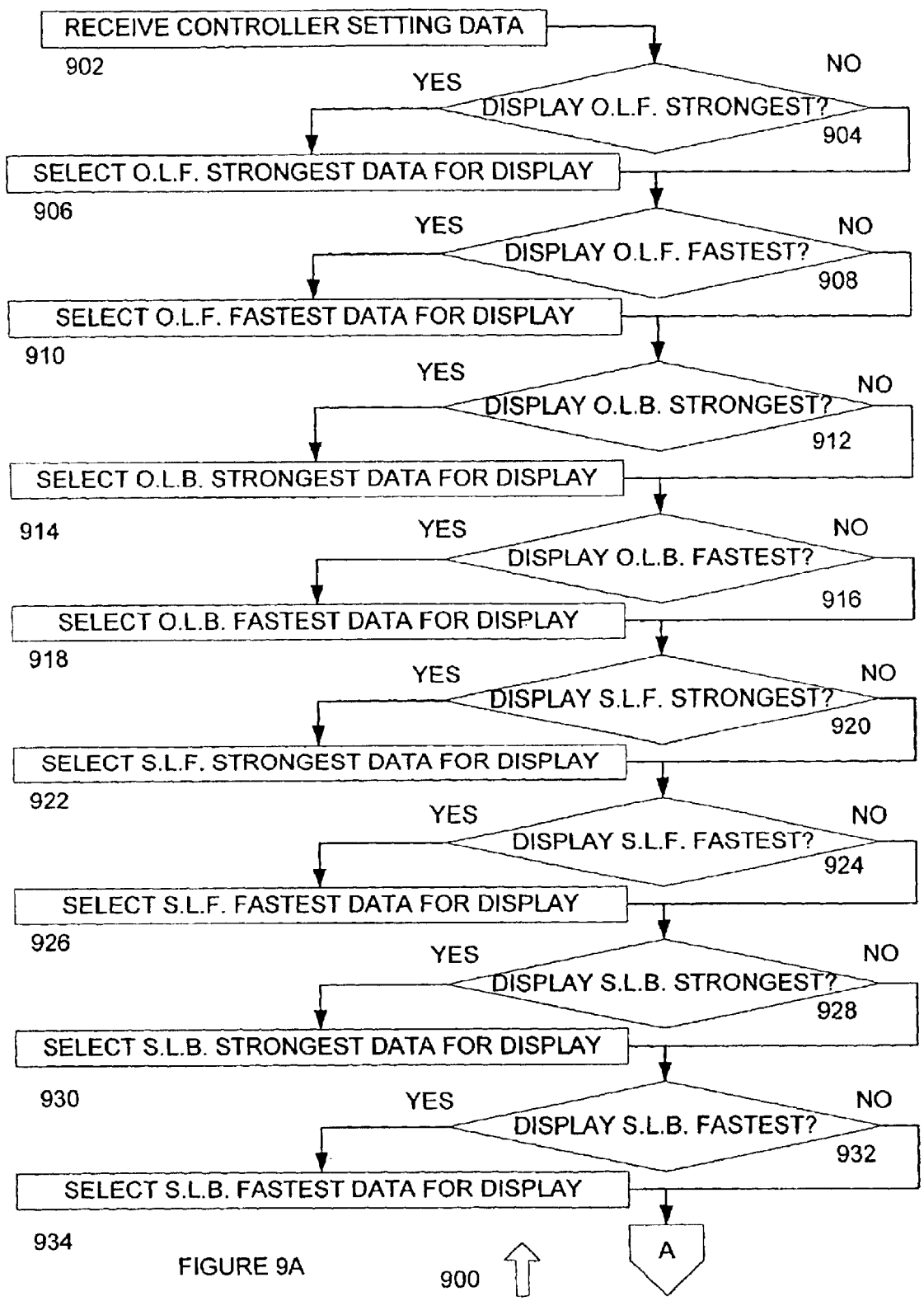
FIG. 9 is a flowchart of a method for allowing the user to configure a radar data display in accordance with an exemplary embodiment of the present invention.
Figure 9B:
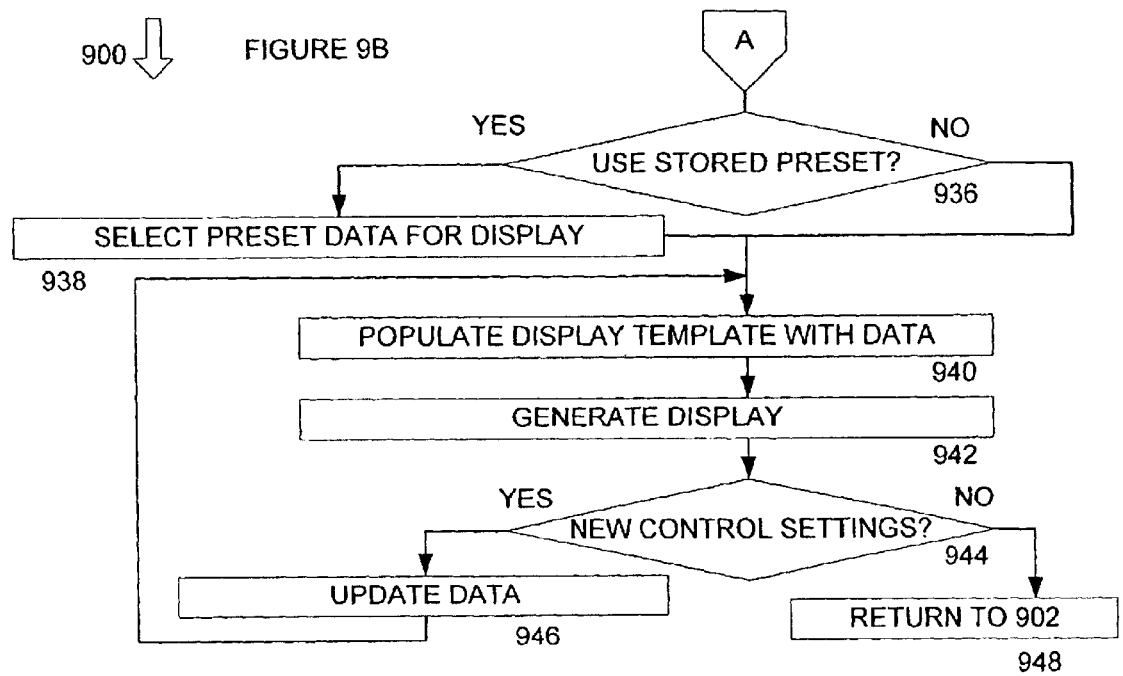

FIG. 9 is a flowchart of a method 900 for allowing a user to configure a radar data display in accordance with an exemplary embodiment of the present invention. Method 900 allows the user to select combinations of data, such as rear and front lane data, same and opposite lane data, a fastest target and the target with a strongest signal, and other suitable combinations of data, to assist the user in monitoring the speed of vehicle traffic and for other suitable purposes. Method 900 further allows the user to make such selections by use of a remote control, by selecting features on a touch sensitive screen where contact coordinates are converted into control command data, or through other suitable systems or processes.

Method 900 begins at 902 where controller setting data is received. The controller setting data can be received as a series of controls, method 900 can be performed after each control entry or series of control entries is completed, the controller setting data can be received as one or more presets, or other suitable configurations can be used to obtain the controller setting data. The method then proceeds to 904.

At 904, it is determined whether control data has been received for displaying vehicle speed data for vehicles having a strongest signal in the opposite lane in front of the radar observation point. If it is determined that this data should not be displayed, the method proceeds to 908. Otherwise the method proceeds 906 where the opposite lane front strongest data is selected for display. In one exemplary embodiment, a buffer read pointer can be used or other suitable settings can be used so as to provide display data for the opposite lane front strongest signal, a preset display configuration can be activated, control data can be transmitted to an antenna signal processor to process opposite lane front strongest signal data, or other suitable configurations can be used. The method then proceeds to 908.

At 908, it is determined whether control data has been received to display the speed of the vehicle having a fastest speed in front of the radar observation point in the opposite lane. If control data for the opposite lane front fastest signal has not been received, the method proceeds to 912. Otherwise, the method proceeds to 910 where the opposite lane front fastest data is selected for display. In one exemplary embodiment, a buffer read pointer can be used or other suitable settings can be used so as to provide display data for the opposite lane front fastest signal, a preset display configuration can be activated, control data can be transmitted to an antenna signal processor to process opposite lane front fastest signal data, or other suitable configurations can be used. The method then proceeds to 912.

At 912, it is determined whether control data has been received for displaying the speed of the vehicle having a strongest signal in the opposite lane and in back of the radar observation point. If it is determined that the opposite lane back strongest signal should not be displayed, the method proceeds to 916. Otherwise the method proceeds 914 where the opposite lane back strongest data is selected for display. In one exemplary embodiment, a buffer read pointer can be used or other suitable settings can be used so as to provide display data for the opposite lane back strongest signal, a preset display configuration can be activated, control data can be transmitted to an antenna signal processor to process opposite lane back strongest signal data, or other suitable configurations can be used. The method then proceeds to 916.

At 916, it is determined whether control data has been received to display the speed of a fastest vehicle in the opposite lane and in back of the radar observation point. If control data for the opposite lane back fastest signal has not been received, the method proceeds to 920. Otherwise, the method proceeds to 918 where the opposite lane back fastest data is selected for display. In one exemplary embodiment, a buffer read pointer can be used or other suitable settings can be used so as to provide display data for the opposite lane back fastest signal, a preset display configuration can be activated, control data can be transmitted to an antenna signal processor to process opposite lane back fastest signal data, or other suitable configurations can be used. The method then proceeds to 920.

At 920, it is determined whether control data has been received for displaying the speed of the vehicle having a strongest signal in the same lane and in front of the radar observation point. If it is determined that the same lane front strongest signal should not be displayed, the method proceeds to 924. Otherwise the method proceeds 922 where the same lane front strongest data is selected for display. In one exemplary embodiment, a buffer read pointer can be used or other suitable settings can be used so as to provide display data for the same lane front strongest signal, a preset display configuration can be activated, control data can be transmitted to an antenna signal processor to process same lane front strongest signal data, or other suitable configurations can be used. The method then proceeds to 924.

At 924, it is determined whether control data has been received to display the speed of a fastest vehicle in the same lane and in front of the radar observation point. If control data for the same lane front fastest signal has not been received, the method proceeds to 928. Otherwise, the method proceeds to 926 where the same lane front fastest data is selected for display. In one exemplary embodiment, a buffer read pointer can be used or other suitable settings can be used so as to provide display data for the same lane front fastest signal, a preset display configuration can be activated, control data can be transmitted to an antenna signal processor to process same lane front fastest signal data, or other suitable configurations can be used. The method then proceeds to 928.

At 928, it is determined whether control data has been received for displaying the speed of the vehicle having a strongest signal for the same lane and in back of the radar observation point. If it is determined that the same lane back strongest signal should not be displayed, the method proceeds to 932. Otherwise the method proceeds 930 where the same lane back strongest data is selected for display. In one exemplary embodiment, a buffer read pointer can be used or other suitable settings can be used so as to provide display data for the same lane back strongest signal, a preset display configuration can be activated, control data can be transmitted to an antenna signal processor to process same lane back strongest signal data, or other suitable configurations can be used. The method then proceeds to 932.

At 932, it is determined whether control data has been received to display the speed of the vehicle having a fastest speed in the same lane and in back of the radar observation point. If control data for the same lane back fastest signal has not been received, the method proceeds to 936. Otherwise, the method proceeds to 932 where the same lane back fastest data is selected for display. In one exemplary embodiment, a buffer read pointer can be used or other suitable settings can be used so as to provide display data for the same lane back fastest signal, a preset display configuration can be activated, control data can be transmitted to an antenna signal processor to process same lane back fastest signal data, or other suitable configurations can be used. The method then proceeds to 936.

At 936, it is determined whether a stored preset display configuration has been selected. If a stored preset display configuration has not been selected, the method proceeds to 940. Otherwise, the method proceeds to 938 where the preset data is selected for display. In one exemplary embodiment, a buffer read pointer can be used or other suitable settings can be used so as to provide display data for the preset configuration data, control data can be transmitted to an antenna signal processor to process signal data for the preset display configuration, or other suitable configurations can be used. The method then proceeds to 940.

At 940, the display template is populated with display data. In one exemplary embodiment, the display data can be stored in one or more predetermined buffers that are continuously updated regardless of whether or not the display configuration for that data has been set. In another exemplary embodiment, control data can be transmitted to a digital signal processor or other suitable systems that reconfigures the digital signal processor to process only the data of interest, such that processing power is not consumed generating display data that has not been selected by the user. Other suitable configurations can also or alternatively be provided. The method then proceeds to 942 where a display is generated meeting the criteria selected by the user. The method then proceeds to 944.

At 944, it is determined whether new control setting data has been received. If new control setting data has been received, the method proceeds to 948 and returns to 802. Otherwise, the method proceeds to 944 where new radar update data is received and the method returns to 940.

In operation, method 900 allows the user to select one or more controls so as to configure or display data speed data of interest to the user. Method 900 allows the user to select controls by touch sensitive screen controls, button controls, or other suitable controls, and to modify the display in response to changing traffic or patrol conditions.

Figure 10:
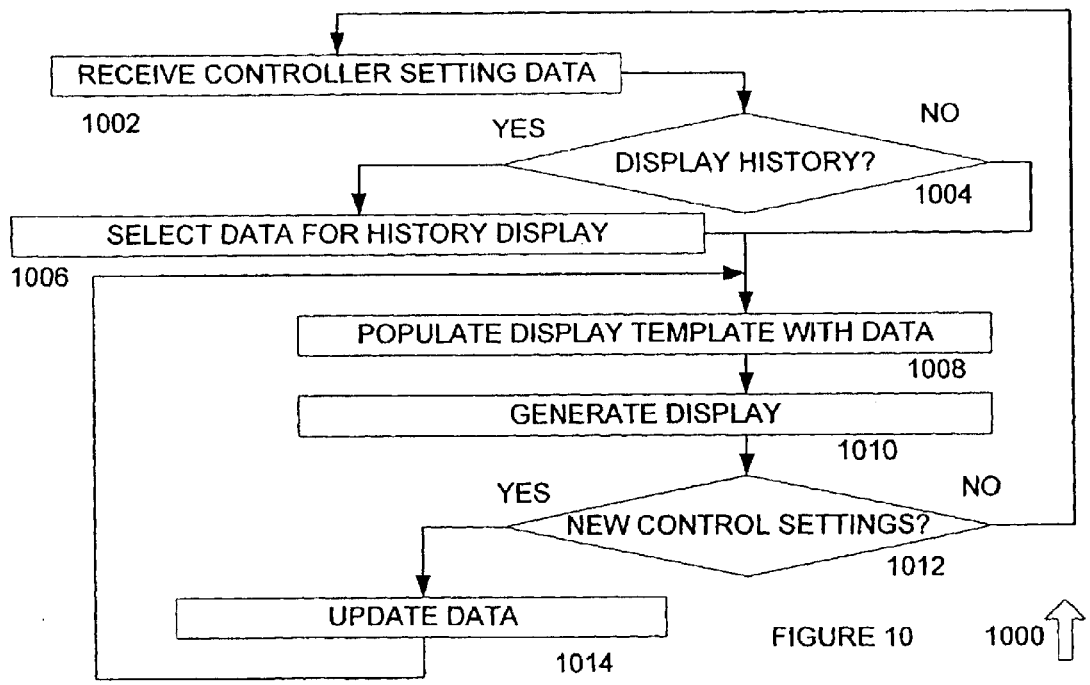
FIG. 10 is a flowchart of a method for selecting the historical display of data in accordance with an exemplary embodiment of the present invention.

FIG. 10 is a flowchart of a method 1000 for selecting the historical display of data in accordance with an exemplary embodiment of the present invention. Method 1000 allows the user to select the display of historical data for a vehicle that has been identified as having a fastest speed or a strongest signal, in same lane or opposite lane as the radar observation point, and using a front or back antenna, in accordance with an exemplary embodiment of the present invention.

Method 1000 begins at 1002 where controller setting data is received. In one exemplary embodiment, the controller setting data can be received by entering commands to a remote controller, by making selections from a touch-sensitive screen, or other suitable controller data. The method proceeds to 1004.

At 1004 it is determined whether a user has requested to display historical data for a setting. In one exemplary embodiment, the user can select for display historical data of the speed of a strongest signal, a fastest signal, for vehicles in the front or the rear, for vehicles in the same lane or opposite lane, or other suitable vehicles. If it is determined at 1004 that display of historical data has not been requested, the method proceeds to 1008. Otherwise the method proceeds to 1006 where historical data is selected for display. In one exemplary embodiment, a predetermined section of buffer memory can be allocated for storing historical data for use in the display (such as the last 100 radar readings), control data can be transmitted to an antenna signal processor to process the selected signal data, or other suitable historical data procedures can be implemented. The method then proceeds to 1008.

At 1008, the display template is populated with data. In one exemplary embodiment, if the template does not include historical display data, then it is populated with the selected speed data. Otherwise, the display template can be populated with historical data for one of the preselected speed settings. The method then proceeds to 1010 where the display is generated, such as by lighting predetermined LED structural components, generating an LCD image, or other suitable processes. The method then proceeds to 1012.

At 1012, it is determined whether new control settings have been received. If new control settings have been received, the method returns to 1002. Otherwise, the method proceeds to 1014 where radar update data is received. The method then returns to 1008.

In operation, method 1000 allows historical data for a target to be displayed on a screen, in a user selectable format. Method 1000 thus allows the user to select whether to show or hide historical data for targets, such as targets detected in the front or back of the patrol vehicle, in the same lane or opposite lane, having a strongest signal or a fastest speed, or other suitable users selectable combinations or preset combinations of target characteristics.

Although exemplary embodiments of a system and method of the present invention been described in detail herein, those skilled in the art will also recognize that various substitutions and modifications can be made to the systems and methods without departing from the scope and spirit of the appended claims.

What is claimed is:

1. A system for displaying radar data comprising:
   an opposite lane display system;
   a same lane display system;
   a front display system;
   a back display system; and
   wherein a combination of one or more of the opposite lane system and the same lane system with one or more of the front display system and the back display system can be selected by a user to provide a display of radar data from one or more user-selected areas of view.

2. The system of claim 1 further comprising a vehicle tracking system identifying one or more vehicles in each user-selected area of view and tracking each vehicle over time.

3. The system of claim 1 further comprising a history system receiving vehicle historical speed data and generating user-readable vehicle historical speed display data.

4. The system of claim 1 further comprising a fastest speed system displaying a speed of a fastest-moving vehicle in at least one of the user-selected areas of view.

5. The system of claim 1 further comprising a strongest signal system displaying a speed of a vehicle having a strongest reflected signal in at least one of the user-selected areas of view.

6. The system of claim 1 further comprising a preset system storing one or more combinations of user-selected areas of view.

7. The system of claim 1 wherein the user-selected areas of view include one or more of a front-opposite lane area of view, a front-same lane area of view, a back-opposite lane area of view, and a back-same lane area of view.

8. A method for displaying radar data for two or more vehicles comprising:
   receiving a user selection of whether to display radar data for vehicles in front of a view point;
   receiving a user selection of whether to display radar data for vehicles behind a view point;
   receiving a user selection of whether to display radar data for vehicles in a same lane of travel relative top a view point;
   receiving a user selection of whether to display radar data for vehicles in an opposite lane of travel relative to a view point; and
   generating one or more displays of radar data based on the user selections.

9. The method of claim 8 further comprising receiving a user selection to display speed data for a vehicle having a fastest speed in one or more of the user-selected displays.

10. The method of claim 8 further comprising receiving a user selection to display speed data for a vehicle having a strongest reflected signal in one or more of the user-selected displays.

11. The method of claim 8 further comprising receiving a user selection to display historical speed data for a vehicle in one or more of the user-selected displays.

12. The method of claim 8 further comprising:
   storing one or more user-selected displays as a preset display selection; and
   recalling the preset display selection by selection of a single preset display control.

13. A controller for use in selecting the display at radar data for two or more vehicles comprising:
   a front select control allowing a user to select radar data for vehicles traveling in front of an observation point;
   a rear select control allowing the user to select radar data for vehicles traveling behind the observation point;
   a same lane select control allowing the user to select radar data for vehicles traveling in a same lane relative to the observation point;
   an opposite lane select control allowing the user to select radar data for vehicles traveling in an opposite lane relative in the observation point; and
   wherein a user-readable display generates radar data for vehicles in one or more user-selected areas of view based on user selections from the front select control, the rear select control, the same lane select control, and the opposite lane select control.

14. The controller of claim 13 wherein the controller further comprises an infrared remote controller.

15. The controller of claim 13 wherein the controller further comprises a touch-sensitive display.

16. The controller of claim 13 further comprising a user-selectable fastest vehicle control causing fastest vehicle speed data to be generated for one or more of the user-selected areas of view.

17. The controller of claim 13 further comprising a user-selectable strongest vehicle control causing vehicle speed data to be generated for a vehicle having a strongest reflected signal in one or more of the user-selected areas of view.

18. The contoller of claim 13 further comprising a user-selectable historical vehicle control causing historical speed data to be generated for one or more vehicles in one or more of the user-selected areas of view.

* * * * *

UNITED STATES PATENT AND TRADEMARK OFFICE
CERTIFICATE OF CORRECTION

PATENT NO. : 6,853,314 B1 Page 1 of 1
APPLICATION NO. : 10/620401
DATED : February 8, 2005
INVENTOR(S) : John L. Aker et al.

It is certified that error appears in the above-identified patent and that said Letters Patent is hereby corrected as shown below:

On the title page, item [54];

In the Title, replace "SYSTEM AND METHOD FOR DISPLAY RADAR DATA" with --SYSTEM AND METHOD FOR DISPLAYING RADAR DATA--

At col. 1, line 1, replace "SYSTEM AND METHOD FOR DISPLAY RADAR DATA" with --SYSTEM AND METHOD FOR DISPLAYING RADAR DATA--

At col. 20, line 29, replace "relative top a view" with --releative to a view--;

At col. 20, line 51, replace "display at radar" with --display of radar--.

Signed and Sealed this

Twenty-ninth Day of January, 2008

JON W. DUDAS
*Director of the United States Patent and Trademark Office*